July 10, 1928.
C. B. PRITCHARD
1,676,925
BULL WHEEL
Filed May 13, 1925
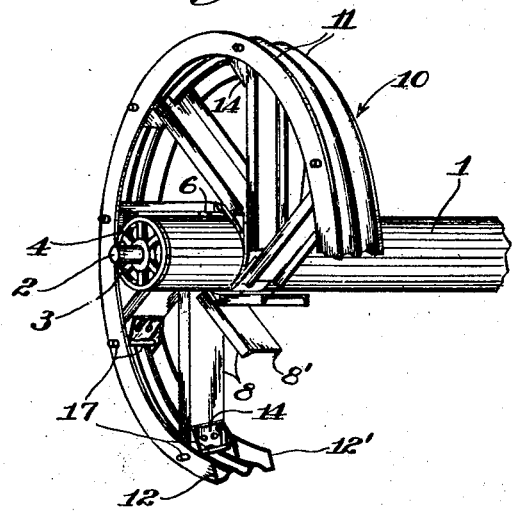
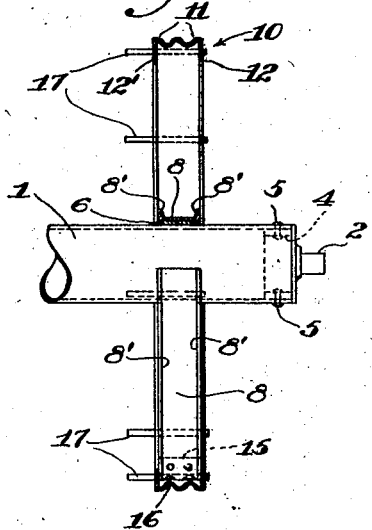
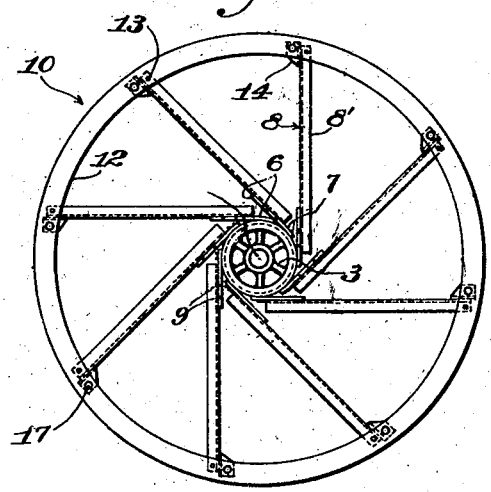
WITNESSES
INVENTOR
Carl B. Pritchard Patented July 10, 1928.

1,676,925

UNITED STATES PATENT OFFICE.

CARL B. PRITCHARD, OF SCOTTDALE, PENNSYLVANIA.

BULL WHEEL.

Application filed May 13, 1925. Serial No. 29,914.

This invention relates to bull wheel structures for oil drilling rigs, and particularly to a novel form of tug wheel and metallic rim therefor.

It is an object of the invention to produce a tug wheel constructed of metal throughout and which combines great strength and rigidity with a minimum weight.

Heretofore, it has been customary to construct wheels of this character with a rim made up of a plurality of sections appropriately connected together to form the complete rim as well as connecting the several sections to the spokes of the wheel. Such constructions have been somewhat unsatisfactory due to the difficulty experienced in obtaining rim sections identical in form and so accurately shaped that when assembled to complete the entire rim, the finished rim would assume a true circular shape. This difficulty was also enhanced due to the distortion of the rim structure as a whole incident to the assembly of the several sections by the workmen and the employment of a number of auxiliary parts for accomplishing the mechanical connection of the rim sections to each other as well as to the spokes of the wheel, besides necessitating the use of a large number of parts. Furthermore, such assembled rim structures unless constructed of heavy material having a large factor of safety, thus rendering them objectionable because of their excessive weight, inevitably result in wheel-constructions lacking the necessary rigidity and strength required to withstand the heavy strains and stresses to which bull wheels are commonly subjected. It is a special object to overcome the disadvantages heretofore noted by providing a tug wheel having a one-piece integrally formed rim which is not only of extreme strength and rigidity, and comparatively light in weight, but which may be readily and quickly assembled with the remaining portions of the wheel during fabrication, and necessitating the employment of a minimum number of auxiliary parts.

These and other objects of the invention will more fully appear when taken in conjunction with the following description and the appended claims.

In the accompanying drawings forming a part of the application, Fig. 1 is a fragmentary perspective view illustrating the preferred embodiment of the invention; Fig. 2 an elevation of the wheel structure shown in Fig. 1; and Fig. 3 a fragmentary view, partly in section and partly in elevation, illustrating the cross sectional shape of the rim, and the method of attaching it to the spokes of the wheel.

Referring to the drawings, 1 designates the tubular metallic bull wheel shaft which is equipped at its ends with the usual gudgeon 2. As shown, this gudgeon is provided with a spider 3 having the annular portion 4 which fits tightly into the open end of the shaft, and is rigidly connected thereto, as by the rivets indicated at 5.

Anchored to the shaft 1, and at a point from the end of the shaft, are a plurality of wing plates 6. The several wing plates are spaced circumferentially of the shaft, and their inner ends may be anchored thereto by any suitable means as by rivets 7.

Rigidly connected to the free end of each of the wing plates is a spoke 8, channel-shaped in cross section, and being provided with the side flanges 8'. The width of the spokes preferably corresponds to the width of the wing plates, and as shown in the drawings, the intermediate portions of the spokes are anchored to the wing plates by riveting indicated at 9.

The rim of the wheel is designated generally by the reference numeral 10, and comprises a corrugated annular peripheral body portion 11 and inturned flanges 12, 12' located at its opposite side edges. These flanges are made integrally with the body 11 so that the body and flanges together form an integral one-piece or unitary structure, and preferably the inturned flanges extend radially inwards at substantially right angles to the body portion of the rim.

The space between the flanges 12, 12' corresponds to the width of the outer extremities of the spokes 8, so that when the said outer extremities are projected between the flanges, they will neatly fit and bridge the space therebetween, with the side flanges 8' of the spokes lying in direct intimate contact with the inturned flanges of the rim. The spokes are directly connected to the rim by means of rivets indicated at 13 which are passed through both the flanges of the spokes and the inturned flanges of the rim, such as clearly indicated in Fig. 2 of the drawings. If desired, a short channel-shaped bracket 14 may be used as a backing brace at the extremity of the spokes, the intermediate portion of the bracket lying in contact with and riveted to the intermediate portion of the spoke, and with the side flanges of the bracket riveted to the inturned flanges of the rim as shown at 15.

For the purpose of enabling the outer extremities of the spokes to be projected a substantial distance within the space afforded between the inturned flanges 12 and 12', and without in any way interfering with the corrugated body portion of the rim, the free ends of the spokes may be notched as shown at 16, the notches being disposed in radial alignment with the inwardly projecting portions of the corrugations on the peripheral face of the rim.

The inwardly projecting rim flange 12', remote from the gudgeon 2, is equipped with a plurality of spaced turning pins 17, for a purpose which will be apparent to those familiar with this art.

Particular attention is directed to the fact that the entire wheel structure described is constructed of metal, that the rim 10 is a one-piece rim comprising a corrugated body portion having inturned flanges defining the width of the rim which flanges are formed integrally with the rim body, that the outer extremities of the spokes are directly connected to the inturned flanges of the rim, and that the method of mounting the rim upon the wheel necessitates the employment of but few auxiliary parts.

It will be apparent that by providing a rim constructed as described, the use of the usual splice-plates, splice-bolts or rivets, and special strenghtening brackets at the juncture of the several rim sections heretofore commonly used is entirely avoided; that the disadvantages arising from the non-circular form of the rim frequently resulting when the rim is built up of a plurality of sections is eliminated; that a rim of substantially true circular shape is provided which possesses great strength and rigidity, and is light in weight, in comparison to the composite structures hertofore used; and that the improved construction of the present invention can be manufactured at a considerably reduced cost. It will also be apparent that due to the employment of an integrally formed single-piece rim, that the wheel illustrated and described in the present application may be more readily and quickly fabricated to produce an extremely satisfactory construction for its intended purpose with the use of a minimum number of parts.

While the invention has been particularly illustrated and described in connection with the tug wheel of a bull wheel structure, it is obvious that the invention may be employed in connection with other than the tug wheels, and it is therefore not intended to limit the invention beyond the scope particularly pointed out and defined by the appended claims.

I claim:

1. In a bull wheel structure the combination of a shaft, a plurality of wing plates rigidly anchored to the shaft and spaced circumferentially thereof, a channel spoke connected to each of said plates, and a one-piece integral rim having a peripheral face and inturned flanges extending radially inwards at its opposite edges defining the width of the rim, the outer extremities of the said spokes neatly fitting within the space beween said inturned flanges of the rim with the side flanges of the spokes rigidly fastened to said inturned flanges.

2. In a bull wheel structure the combination of a shaft, a plurality of wing plates rigidly anchored to the shaft and spaced circumferentially therearound, a spoke channel-shaped in cross section connected to each of said plates, an integral metallic rim having a corrugated peripheral face and intured flanges extending radially inwards at substantially right angles to the said peripheral face at its opposite edges defining the width of the rim, the outer extremities of said spokes neatly fitting within and bridging the space between said inturned flanges and with the side flanges of the spokes in contact with the inturned flanges, said side flanges being rigidly fastened to said inturned flanges of the rim.

3. A circular rim for bull wheels comprising a one-piece sheet metal band having inturned edge flanges formed integrally therewith, and having its body portion intermediate said flanges formed with a plurality of parallel annular corrugations.

4. In a bull wheel structure the combination of a shaft, a plurality of wing plates rigidly anchored to the shaft and spaced circumferentially thereof, a channel spoke connected to each of said plates, and a one-piece sheet metal rim having inturned flanges extending radially inward at its opposite edges and adapted to engage the flanges of said channel spokes, the body portion of said rim between the inturned flanges being corrugated and the ends of said channel spokes being grooved to register with said corrugations.

5. As an article of manufacture a bull wheel rim for drilling rigs comprising a strip of sheet metal formed into a band with its ends welded together, its edges turned inward to form spoke-attaching flanges, and its face being formed into a plurality of annular corrugations.

6. In a bull wheel construction as an article of manufacture, a strip of sheet steel formed into a band with its ends joined together, its edges turned inward to form flanges adapted to be attached to cooperating inner members, and its face being formed into a plurality of annular corrugations.

In testimony whereof, I sign my name.

CARL B. PRITCHARD.